United States Patent [19]

Bliudnikas

[11] 4,114,165
[45] Sep. 12, 1978

[54] PRECISION TRACK FOR MOVING FACSIMILE RECORDING BLADE

[75] Inventor: Kestutis E. Bliudnikas, North Grafton, Mass.

[73] Assignee: Alden Research Foundation, Westboro, Mass.

[21] Appl. No.: 754,904

[22] Filed: Dec. 27, 1976

[51] Int. Cl.[2] .......................................... G01D 15/06
[52] U.S. Cl. ............................. 346/139 C; 346/165
[58] Field of Search ............ 346/139 C, 139 R, 101, 346/165

[56] References Cited

U.S. PATENT DOCUMENTS

| 2,655,427 | 10/1953 | Alden | 346/165 |
| 2,743,990 | 5/1956 | Leonard | 346/139 C X |
| 3,599,230 | 8/1971 | Alden | 346/139 C |

Primary Examiner—Joseph W. Hartary
Attorney, Agent, or Firm—Grover and Meegan

[57] ABSTRACT

In a facsimile recorder of the type having a relatively fast moving helical scanning electrode opposed by the linear portion of a very slow moving looped electrode or blade, the linear portion is guided in a track with a wall engaging one side of the blade. On the opposite side of the linear portion a strip with spring fingers holds the blade electrode precisely straight against the track wall.

7 Claims, 5 Drawing Figures

PRECISION TRACK FOR MOVING FACSIMILE RECORDING BLADE

BACKGROUND OF THE INVENTION

In a successful type of facsimile recorder an electrolytic paper or other web is fed between a helical scanning electrode and a linear blade electrode from which metal ions are electrically transferred to the paper by electrical facsimile signals applied between the two electrodes. As a result of such electrolytic erosion the blade electrode tends to wear unevenly and distort the record marked on the paper. To avoid uneven erosion the blade electrode is formed in a loop which is slowly fed lengthwise to distribute erosion evenly as shown in U.S. Pat. No. 3,638,237 which is incorporated herein by this reference. At the recording zone when the helical electrode effectively scans across the blade the blade electrode is typically held in linear form by a track having opposed walls between which the blade electrode fits. Because the blade is necessarily curved in part of its loop it tends not to assume a precisely linear form when moving along the track. Consequently the marks recorded on the paper vary from a straight line and distort the marked graphic record.

It is the object of the invention to provide a way of precisely straightening the loop electrode in its linear portion.

STATEMENT OF INVENTION

According to the invention apparatus for electrically recording graphic signals on a web with a moving, loop electrode comprises a motor for driving the electrode in a looped path including a linear portion, a linear track receiving the electrode and guiding it on the linear portion, and spring means on the track extending along the linear portion and engaging the side of the electrode so as to urge it against the track through the linear portion of the electrode.

DRAWINGS

DESCRIPTION

Figure 1:
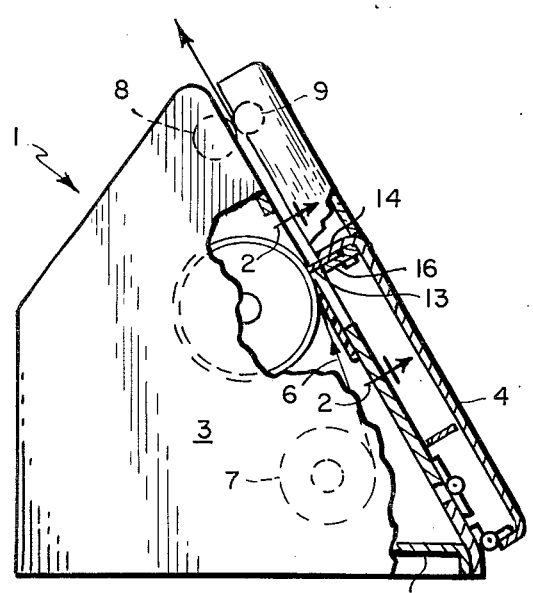
FIG. 1 is a side elevation of facsimile recording apparatus according to the invention.
Figure 3:
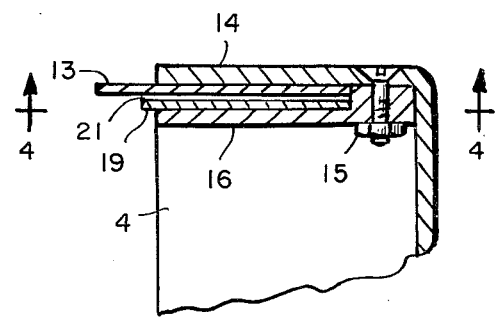
FIG. 3 is a further enlarged section on line 3—3 of FIG. 2.
Figure 2:
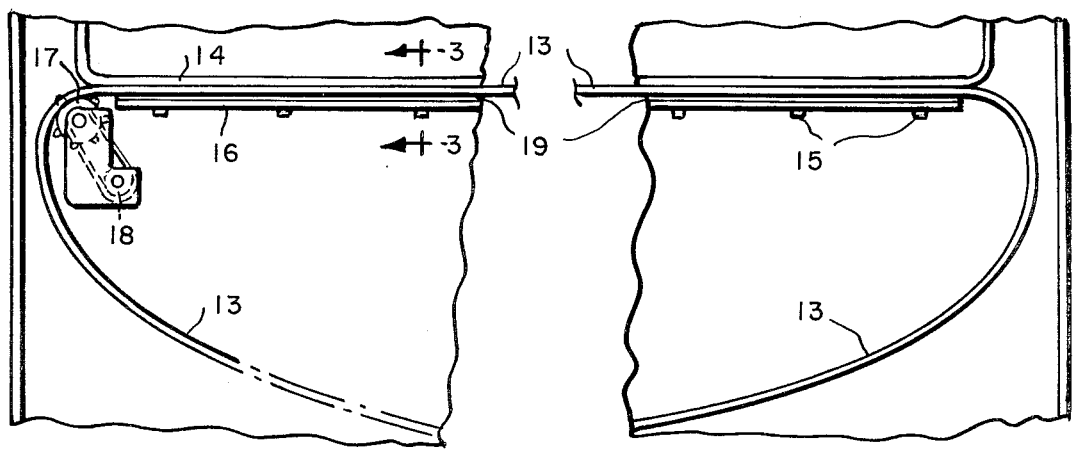
FIG. 2 is an enlarged section on line 2—2 of FIG. 1 showing a loop electrode guide track with a spring strip.

The facsimile recorder of FIG. 1 comprises a housing 1 with a base 2, side walls 3, and a cover 4 hinged to the base. Recording paper 6 is drawn from a supply roll 7 by a drive roll 8 and an idler roll 9. Graphic signals are electrically marked on the paper by a helical electrode 11 on a rotating drum 12 and by a blade electrode 13. As shown in FIGS. 2 and 3 the blade electrode is in the form of an endless loop guided on a linear portion between two walls or jaws, outer jaw 14 integral with the cover and inner jaw 16 fixed to the cover by bolts 15. At the left end of its linear portion the blade is engaged by a sprocket wheel 17 driven slowly by a motor 18 and moved in an orbit around its loop thereby continuously replacing the linear portion between the jaws 14, 16 of the guide track. Movement of the blade assures even marking of the paper, but the blade cannot be gripped tightly in the jaws and because of its natural curved, loop form tends to deviate from precise linearity in the track.

Figure 5:
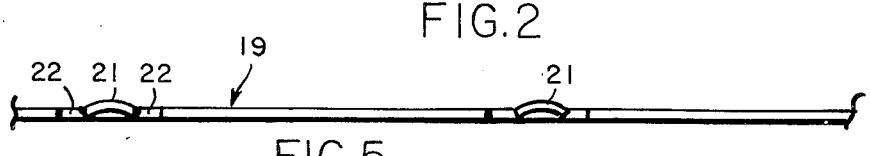
FIG. 5 is an edge view of the spring strip.
Figure 4:
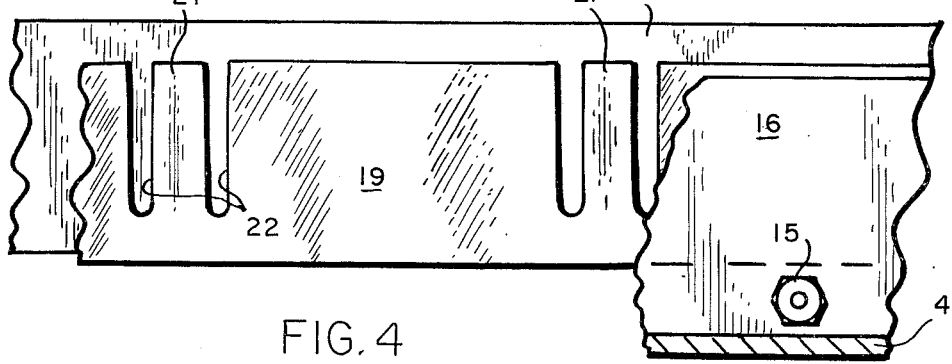
FIG. 4 is an enlarged side view of the guide track and spring strip of FIG. 2.

According to the invention this deviation is avoided by including an elongate strip 19 of springy metal such as beryllium copper in the guide track adjacent one jaw 16. As shown in FIGS. 4 and 5 the strip 19 has a plurality of spring fingers 21 defined by cutouts 22 across the strip. The spring fingers are further bowed out of the plane of the strip on the side opposing the blade 13 substantially throughout their length extending across the strip. As shown in FIG. 3 the space between the jaws 14 and 16 is filled by the thickness of the blade 13 and strip 19, and the bow of the spring fingers 21. In a linear blade portion eighteen inches long the spring fingers are spaced approximately one and a half inches apart and thus apply substantially continuous yielding pressure substantially across the blade throughout its linear portion. The blade is thus urged positively straight against the outer wall or jaw 14 rather than curving back and forth between jaws 14 and 16 as hitherto. At the same time the blade is not so tightly fitted between the jaws as to jam if any paper or recording residue builds up on the blade.

It should be understood that the present disclosure is for the purpose of illustration only and that this invention includes all modifications and equivalents which fall within the scope of the appended claims.

I claim:

1. Apparatus for electrically recording graphic signals on a web with a moving, loop electrode comprising:
    a motor for driving the electrode in a looped path including a linear portion;
    a linear track including two fixed walls for receiving the electrode and guiding the electrode on the linear portion; and
    spring means on the track between the walls extending along the linear portion and engaging the side of the electrode so as to urge it against one of the walls of the track through the linear portion of the electrode whereby the loop is precisely straightened in its linear portion to provide straight line markings on the web.

2. Apparatus according to claim 1 wherein the spring means comprises a plurality of spring fingers.

3. Apparatus according to claim 2 wherein the spring fingers are cut out of an elongate strip of spring material.

4. Apparatus according to claim 3 wherein the fingers are bowed out of the plane of strip material.

5. Apparatus according to claim 4 wherein the fingers extend substantially across the strip and blade.

6. Apparatus according to claim 1 including a scanning electrode and means for moving the same effectively along the linear portion of the loop electrode.

7. Apparatus according to claim 6 wherein the loop electrode is held positively straight against the track wall.

* * * * *